United States Patent
Smith, Jr.

(10) Patent No.: US 7,036,016 B1
(45) Date of Patent: Apr. 25, 2006

(54) METHOD AND APPARATUS FOR SECURING A LIST OF PASSWORDS AND PERSONAL IDENTIFICATION NUMBERS

(76) Inventor: A. James Smith, Jr., 4901 Gulf Shore Boulevard Dr., Apt. 1903, Naples, FL (US) 34103

( * ) Notice: Subject to any disclaimer, the term of this patent is extended or adjusted under 35 U.S.C. 154(b) by 159 days.

(21) Appl. No.: 10/409,574

(22) Filed: Apr. 8, 2003

Related U.S. Application Data

(60) Division of application No. 09/970,955, filed on Oct. 4, 2001, now Pat. No. 6,571,336, which is a continuation-in-part of application No. 09/891,132, filed on Jun. 25, 2001, now abandoned, which is a continuation of application No. 09/022,578, filed on Feb. 12, 1998, now Pat. No. 6,253,328.

(51) Int. Cl.
 *G06C 1/06* (2006.01)
(52) U.S. Cl. .................. 713/185; 713/184; 380/51; 380/54; 340/5.51; 340/5.6
(58) Field of Classification Search ................ 713/184, 713/185, 202; 380/51, 54, 55, 56; 340/5.51, 340/5.6
See application file for complete search history.

(56) References Cited

U.S. PATENT DOCUMENTS

| | | |
|---|---|---|
| 312,665 A | 2/1885 | Smith |
| 4,184,148 A | 1/1980 | Smagala-Romanoff |
| 4,734,040 A | 3/1988 | North et al. |
| 4,857,914 A | 8/1989 | Thrower |
| 5,056,141 A | 10/1991 | Dyke |
| 5,177,789 A | 1/1993 | Covert |
| 5,251,259 A | 10/1993 | Mosley |

(Continued)

OTHER PUBLICATIONS

Kak, Subhash, "The Aryabhata Cipher," Cryptologia, vol. XII, No. 2, Apr. 1988, pp. 113-117.

(Continued)

*Primary Examiner*—Justin T. Darrow
(74) *Attorney, Agent, or Firm*—Gibbons, Del Deo, Dolan, Griffinger and Vecchione

(57) ABSTRACT

A method for securing passwords, personal identification numbers and identifying patterns utilizes a MasterCode camouflaged within a grid which contains all the characters, symbols or pictograms of which the MasterCode is a subset. For securing numeric sequences, the MasterCode is comprised of ten characters randomly associated to a corresponding digit (including zero). The characters thereby associated with each numeric password are expanded into an ordinary, natural language word, a SecureWord using non-associated letters. The MasterCode is masked by its unique placement in a MasterGrid known only to the user. For securing passwords comprised of alpha numeric symbolic characters, each unique character, the MasterCode, is assigned a sequential number which becomes a sequence of positions in the MasterGrid with each MasterCode character placed in the appropriate position and the remainder of the character set filled in. SecureNumbers are the positions in the MasterGrid of each character in a password. For securing patterns, a MasterGrid containing a set of pictograms is chosen from an offered array of such sets. The user then makes a pattern in the MasterGrid, his MasterCode. To gain access, the user must identify his MasterGrid from an array of similar grids and correctly recreate his pattern. Apparati for implementing the method are also described.

16 Claims, 15 Drawing Sheets

U.S. PATENT DOCUMENTS

| | | | |
|---|---|---|---|
| 5,265,162 A | | 11/1993 | Bush et al. |
| 5,276,314 A | | 1/1994 | Martino et al. |
| 5,363,449 A | | 11/1994 | Bestock |
| 5,377,270 A | | 12/1994 | Koopman, Jr. et al. |
| 5,428,349 A | | 6/1995 | Baker |
| 5,608,387 A | * | 3/1997 | Davies ............ 340/5.27 |

OTHER PUBLICATIONS

Millikin, D.D., "Elementary Cryptography and Cryptanalysis," Aegean Park Press, 1943, pp. 4-13 and 70-82.

James Raymond Wolfe, Secret Writing-The Craft of the Cryptographer, 1970.

Walt Babson, All Kinds of Codes, 1976.

Kenneth L. Higbee, Ph.D., Your Memory-How it Works and How to Improve it, 1977.

Francis Fauvel-Gouraud, D.E.S., The Art of Memory, 1845.

BYTE Magazine, The McGraw-Hill Co., Some Assembly Required, 1990.

Tony Buzan, Use Your Perfect Memory, 1984.

* cited by examiner

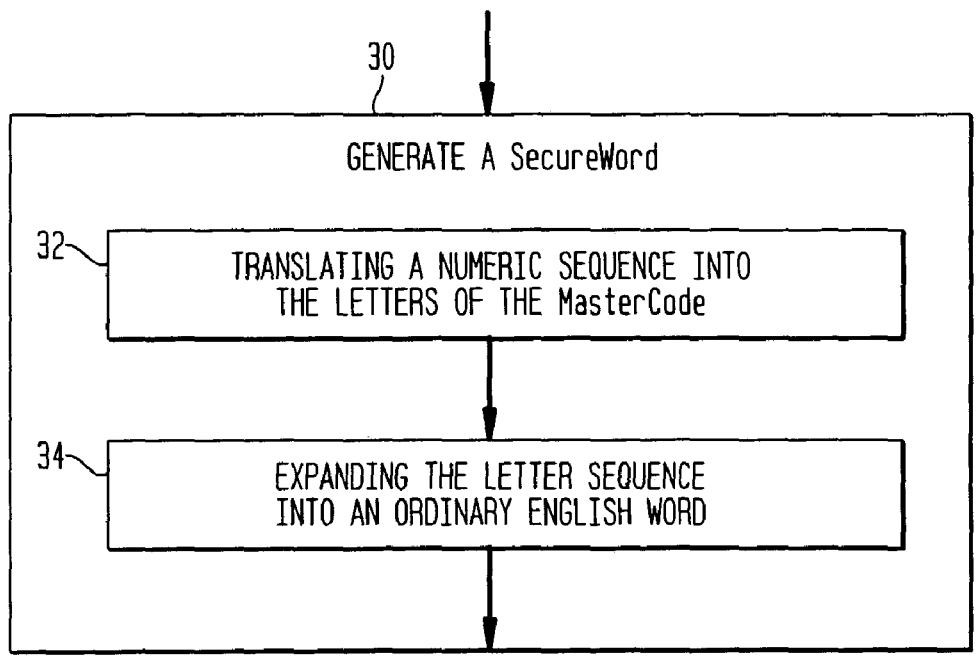
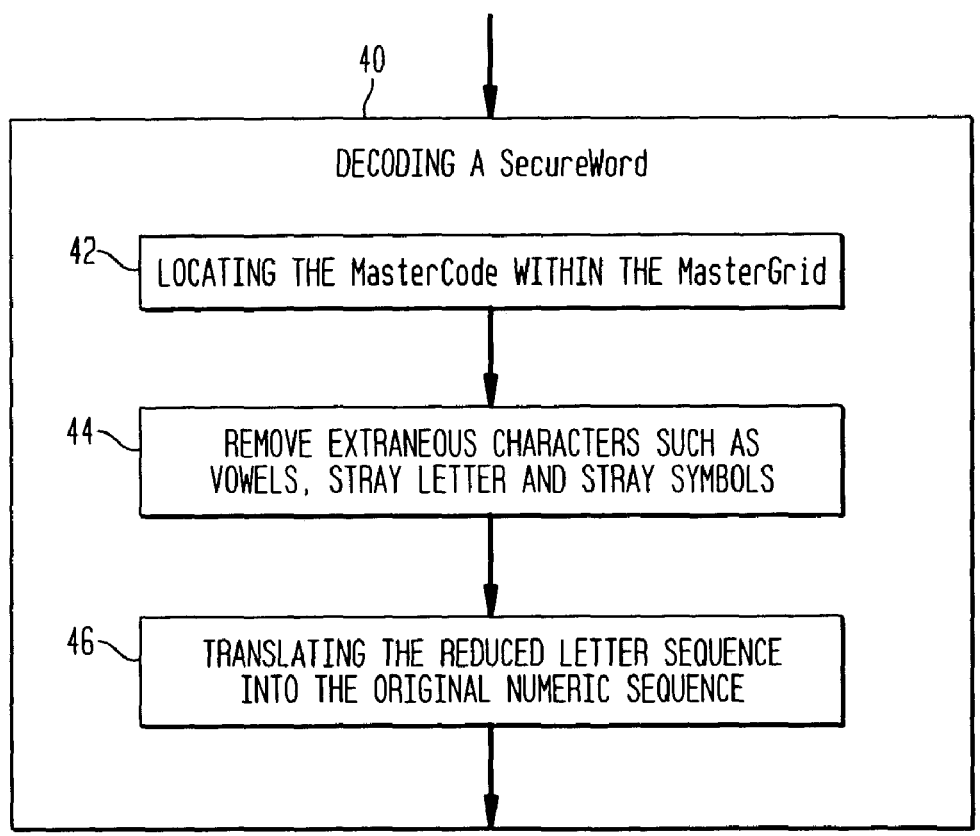

| f | ) | / | ! | 8 | t | v | b | F |
|---|---|---|---|---|---|---|---|---|
| j | } | 0 | 4 | % | M | H | k | { |
| s | n | : | 9 | & | J | Q | _ | # |
| Y | Q | I | m | 2 | L | a | 6 | ? |
| E | 1 | y | X | d | z | e | C | 3 |
| g | p | V | A | < | q | S | I | R |
| 7 | B | $ | > | T | ] | - | h | G |
| W | r | D | w | x | Z | 5 | c | o |
| U | N | 8 | u | [ | i | P | K | * |

[G]  <u>MasterCode</u>

[H]　　　　　MasterCode

|   |   |   |   |
|---|---|---|---|
| n | : | 9 | & |
| Q |   |   | 2 |
| 1 |   |   | d |
| p |   |   | < |
| B |   |   | T |
| r |   |   | x |
| N |   |   |   |

| [K] | | | | | | | | | |
|---|---|---|---|---|---|---|---|---|---|
| | f | ) | / | ! | 8 | t | v | b | F |
| | j | } | 0 | 4 | % | M | H | k | { |
| | s | n | : | 9 | & | J | O | _ | # |
| | Y | Q | I | m | 2 | L | a | 6 | ? |
| | E | 1 | y | X | d | z | e | C | 3 |
| | g | p | V | A | < | q | S | ( | R |
| | 7 | B | $ | > | T | ] | - | h | G |
| | W | r | D | w | x | Z | 5 | c | o |
| | U | N | @ | u | [ | i | P | K | * |

706

```
07 05 14 08 04
15 01 12 06 09
11 13 03 10 02
02 11 14 09 05
06 03 14 04
```

US 7,036,016 B1

METHOD AND APPARATUS FOR SECURING A LIST OF PASSWORDS AND PERSONAL IDENTIFICATION NUMBERS

RELATED APPLICATIONS

This application is a divisional of application Ser. No. 09/970,955, filed Oct. 4, 2001 now U.S. Pat. No. 6,571,336 B1, entitled Method And Apparatus For Securing A List of Passwords And Personal Identification Numbers, which is a Continuation-In-Part of U.S. patent application Ser. No. 09/891,132, filed on Jun. 25, 2001 now abandoned, entitled Method And Apparatus For Securing Passwords And Personal Identification Numbers, which is a Continuation of U.S. patent application Ser. No. 09/022,578, now U.S. Pat. No. 6,253,328 B1, entitled Method And Apparatus For Securing Passwords And Personal Identification Numbers, filed on Feb. 12, 1998, which are hereby incorporated by reference.

FIELD OF THE INVENTION

This invention relates to secured systems using pattern recognition as a method for protecting access, and more particularly to secured lists of passwords and personal identification numbers and graphical patterns.

BACKGROUND OF THE INVENTION

Systems that are secured for use only by authorized individuals frequently rely upon a password or personal identification number (PIN). Examples of systems which utilize PINs include college registration, employee access to information, cellular phones and other communication devices in addition to savings and checking accounts, ATM transactions, telephone calling cards, debit cards, credit cards and numerous other systems.

While some individuals are able to remember random sequences of numbers and letters, most passwords and PINs that are selected by the individual have some personal relevance so that they can be easily remembered; and thereby, vulnerable to unauthorized access. When random words and numbers are used or assigned (often in combination), they are frequently written in a list that is kept handy. The list of passwords and PINs is often difficult to secure, which also facilitates unauthorized access.

Thus, individuals are faced with the dilemma of either having a password or PIN that is easy to remember and consequently facilitates unauthorized access or having a password or PIN that is so difficult to remember that it has to be written down, also facilitating unauthorized access. Therefore, there is a need for a system to secure a list of passwords and PINs from unauthorized access, but which are easily accessed.

SUMMARY OF THE INVENTION

The present invention concerns a method and system for using pattern recognition as a method for providing access as well as protecting access to a list of passwords, personal identification numbers or patterns. A grid is used for tracing a user-defined path through it to identify a set of unique characters positioned on the path. The set itself is one of a subset of a much larger set which is determined by the size of a rectilinear grid. Each character of the full set appears once and only once on the grid in individualized order and each user describes a unique sub-set of characters.

A path of 10 locations in the grid facilitates an embodiment in which the characters to be encoded are primarily numeric so that each location represents, one of the nine digits plus zero. A master code (MasterCode) of 10 natural language characterizes is generated with each letter assigned to one of the digits. To encode a numeric password (PIN) a word list is searched to identify natural language words which meet 3 conditions: (1) they contain the letters assigned to the pin; (2) the assigned letters occur only in the same order as in the pin; and (3) the unused letters in the MasterCode do not occur.

In another embodiment the characters from which a MasterCode can be drawn include numbers, symbols and upper and lower case letters. The identification of the step in the path by numeric sequence creates a SecureNumber. A typical use would be where 81 keyboard symbols, numbers and letters comprise the larger set; a randomly selected 15 to 20 unique characters comprise the MasterCode group for a given individual; each of the assigned passwords of 4 to 8 characters is randomly generated to from the MasterCode.

In another embodiment, a "master" computer generates a series of grids with characters or picto grams in different arrangements and provides them to a "slave" computer. The slave computer chooses any one of the grids as the first step. Next, it selects a path through the chosen grid. To retrieve the PIN the slave computer first selects the unique grid it provided previously, and next the unique path in the grid is traced. Either step can be controlled by the keyboard, mouse, stylus, pointing devices, orally or, a combination of these. The Oral control provides an additional level of security beyond the security provided with the encrypted password alone. If the proper pictogram and path are chosen, valid access is enabled.

BRIEF DESCRIPTION OF THE DRAWINGS

A more complete understanding of the present invention, which in the broadest sense involves securing access to data by creating a graphical image, and encrypting data using the graphical image as an encryption key to unlock access, may be obtained from consideration of the following description in conjunction with the drawings in which:

FIG. 2 is a flow chart of the steps involved in generating a SecureWord or set of SecureWords;

FIG. 3 is a flow chart of the steps involved in decoding a SecureWord;

FIG. 12 is a view of a sequencial pattern formed on a grid according an alternate embodiment of the present invention as in FIG. 11;

FIG. 13 is a view of a set of characters for use in passwords arranged along the sequential pattern of FIG. 12;

FIG. 14 is a view of a MasterGrid with the remaining characters filled in randomly according to an alternate embodiment of the present invention;

FIG. 15 is a view of a MasterCode and corresponding to a plurality of passwords;

FIG. 16. is a view of the MasterCode and passwords of FIG. 15 illustrating the numeric relationship of the Master-Code.

FIG. 17 is a view of the MasterCode, passwords and MasterGrid of FIGS. 12 and 16;

FIG. 18 is a view of the MasterCode, SecureNumbers, passwords and MasterGrid of FIGS. 13 and 16; and FIG. 19 is a view of a MasterGrid in association with passwords represented as SecureNumbers.

DETAILED DESCRIPTION OF VARIOUS ILLUSTRATIVE EMBODIMENTS

Figure 1:
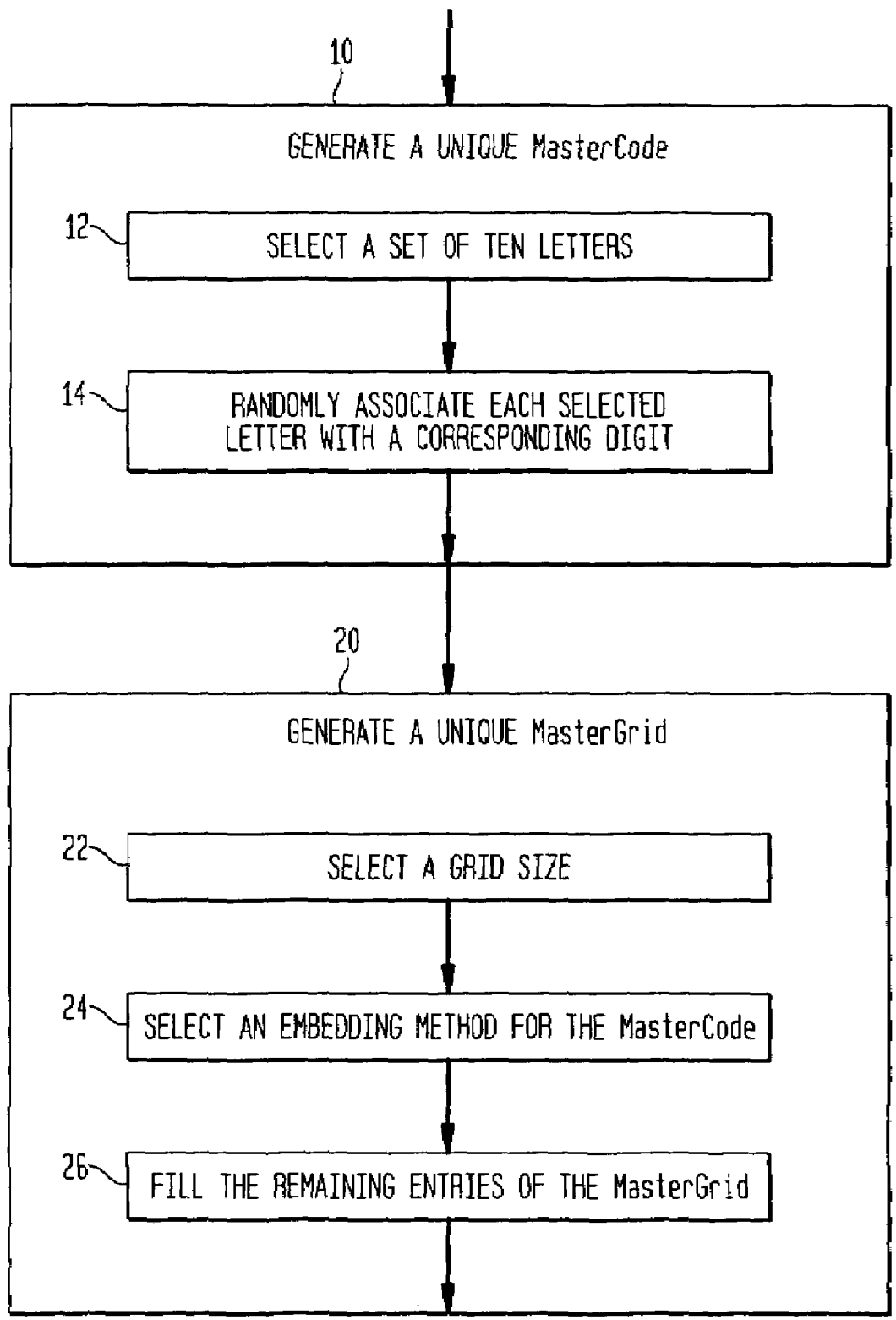
FIG. 1 is a flow chart of the steps involved in the SecureWord system for generating a MasterCode and a MasterGrid.

Although the present invention is particularly well suited for use with a list of alphanumeric symbolic passwords; protected personal identification number (PIN); or pattern recognition passwords and shall be so described, the present invention is equally well suited for use with other systems which require secured access via a pattern, combination or a sequence of numbers, letters, and/or other symbols.

SecureWord can be utilized as a stand-alone device residing in any of a variety of digital devices including: computers; personal information managers; personal digital assistants; programmable watches; essentially on any device having alphanumeric input and capable of generating a grid which can be manipulated with a cursor, pointer, stylus, finger, etc. In one embodiment of the present invention, a path through a MasterGrid is utilized as a security key to accessing stored passwords directly. The SecureWord system with its MasterCode is used to store encrypted numeric password aliases.

The present invention secures a list of passwords and PINs from unauthorized access while enabling easy authorized access to the list. By combining a user-defined path through a grid with an encryption system for the passwords, the dilemma of having access to a list of passwords or PINs without negating the security of the passwords or PINs is resolved. The present invention is best understood by first looking at exemplary embodiments of an encryption system.

Advantageously, the present invention improves upon other password protection methodologies by permitting the user to simply remember an image or pattern formed on a grid. Recognizing that a picture can be worth a thousand words. The user, by remembering the pattern on the grid, recreates a MasterCode that then enables him to identify his passwords which are otherwise masked by the MasterGrid.

This graphical user interface for masking and accessing passwords is described herein in two embodiments. In a first embodiment, the invention utilizes this masking feature with an encryption method wherein the user's encryption key or MasterCode is further masked for safe storage in a Master-Grid. Numeric passwords or personal identity numbers (pins) are converted into letters that are expanded into natural language words by utilizing extraneous letters. In a second embodiment, alphanumeric or other character symbols are converted to a numeric representation, SecureNumbers. Both embodiments allow the encoded passwords—the SecureWords or SecureNumbers—to be kept in plain view. In a third embodiment wherein access to a device requires that a pattern, a MasterCode be retraced on a grid, a MasterGrid is identified and a previously assigned Master-Code is recreated.

SecureWord & Secure Number Embodiments

1. Secure-Word

The problem of making numeric sequences easier to remember has long been of great concern and is described in detail in U.S. patent application Ser. No. 09/022,578, now U.S. Pat. No. 6,253,328 B1, entitled Method And Apparatus For Securing Passwords And Personal Identification Numbers.

Although the present invention is particularly well suited for use with the English language and shall be so described, the present invention is equally well suited for use with other natural character based languages. Wherein natural languages are those languages that may be spoken, read, and written by individuals.

While analytic substitutions and other methods make remembering a difficult sequence easier, the very solution compromises the security that was obtained from using the difficult sequence. Words and even phrases can be related to a series of numeric sequences, but when the association between them and the numbers become known, the security provided by the original numeric sequence is compromised. While this may be quite useful for remembering dates, telephone numbers, license plates, time schedules, prices, etc. the very ease of the system and its appearance in the popular literature compromises its use for any secure numeric sequence. Essentially, the words and phrases are not secure.

By creating a unique MasterCode a user can convert a random set of numbers into a set of letters that are then embodied in ordinary English words using extraneous letters. Only the user knows how to translate the English words back into the PIN or password numeric sequence.

SecureWord can be utilized as a stand-alone device residing in any of a variety of digital devices including: computers; personal information managers; personal digital assistants; programmable watches; essentially on any device having alphanumeric input and capable of generating a grid which can be manipulated with a cursor, pointer, stylus, finger, etc. In one embodiment of the present invention, a path through a MasterGrid is utilized as a security key to accessing stored passwords directly. The SecureWord system with its MasterCode is used to store encrypted numeric password aliases.

The SecureWord system is an encryption translation method for encrypting numeric sequences into alphabetic characters (the MasterCode) and expanding the encryption into a natural language word, words, sets of words or phrases which are easy to remember and simple to decode. The assignment of the character sequence to the 10 digits is done randomly for each user and each user determines which squares in the grid will contain the MasterCode characters. The character sequence corresponding to a particular numeric sequence can then be referenced to or scanned against a word list. (In this application the use of the term word list shall mean a traditional dictionary, word list, comprehensive word list, word generation algorithm, and other methods of validating words.) This character sequence is expanded with unassociated letters to extract ordinary English words, sets of words and phrases from the word list. A computer can be used to translate the numeric sequence such as a PIN or password with the user's MasterCode and then scan the word list to locate all the words that fit the character sequence with unassociated letters preceding, interspersed and following the characters of the character sequence ignoring the other letters of the MasterCode not in the particular password. Since the system can locate all of the words fitting the letter sequence of the "converted" password, the system does not require any particular or specific character(s) relationship to any particular or specific digit(s). The MasterCode may include symbols.

The SecureWord system allows passwords to be comprised of totally random sequences. If any symbols are used to represent digits in a password, then the system ignores the symbol in locating words and also randomly inserts other symbols into other SecureWords in the list, thus masking the relevance of any specific symbol.

As the Master Code is totally arbitrary, it is difficult to memorize. Initially, some users may need to have both their MasterCode and their SecureWords written down. The list of SecureWords alone does not supply enough information to convert them back into the original sequence. However, having the MasterCode and the SecureWords would permit the decoding of the original sequences.

In order to protect the MasterCode, the SecureWord system produces a MasterGrid, such as a 5×5 grid, (when only letters are used: a 6×6 grid, (when symbols may be utilized); or an n by m grid in which the MasterCode is masked or camouflaged among the remaining letters and symbols comprising the character set. The ten characters of the MasterCode are arranged within the MasterGrid in a relationship only known to the user. The existence of grid codes for encryption known to practitioners of the art actually enhances the security of the SecureWord system by actually aiding in the masking or camouflaging of the MasterCode as fruitless attempts to use these techniques may identify unauthorized access attempts.

A SecureWord system user can select words, which are easy for him to remember from the computer-generated list. The SecureWords may be memorized or recorded. The MasterGrid may be written and kept to allow the user rapid decoding of the SecureWords. For a better understanding of how the SecureWord system works, let us look at an exemplary embodiment. The digits 0, 1, 2, 3, 4, 5, 6, 7, 8 and 9 are randomly assigned to ten consonants, which is shown in Table 1.

TABLE 1

| Digit | Sound |
|---|---|
| 0 | L |
| 1 | R |
| 2 | M |
| 3 | N |
| 4 | T |
| 5 | S |
| 6 | P |
| 7 | V |
| 8 | K |
| 9 | C |

This represents the MasterCode, which can then be embedded into a MasterGrid such as that shown in Table 2.

TABLE 2

| L | R | M | N | T |
|---|---|---|---|---|
| A | H | Q | D | U |
| S | P | V | K | C |
| W | B | I | Y | E |
| F | Z | G | J | O |

Referring to Table 3 the MasterCode is shown found in the first and third lines of the MasterGrid with the corresponding numeric relationship. The MasterGrid when printed or written would only appear in the form that is shown in Table 2. The corresponding numeric relationships would only be known to the SecureWord system user. Thus even having access to the actual MasterGrid and the SecureWords would not easily permit decoding of the SecureWords to determine the original numeric sequences. The location of the MasterCode within the MasterGrid is the only item that a user must memorize in order to retain security. Optionally a SecureWord system user can memorize their SecureWords and even their SecureWords for enhanced security.

TABLE 3

| L/0 | R/1 | M/2 | N/3 | T/4 |
|---|---|---|---|---|
| A/ | H/ | Q/ | D/ | U/ |
| S/5 | P/6 | V/7 | K/8 | C/9 |
| W/ | B/ | I/ | Y/ | E/ |
| F/ | Z/ | G/ | J/ | O/ |

The actually arrangement of the MasterCode within the MasterGrid can be almost unlimited, with the MasterCode being embedded vertically, which is shown in Table 4, as well as horizontally, which was shown in Table 3, embedded in alternating locations which is shown in Table 5, diagonally, as well as various other permutations and other sequences.

TABLE 4

| L/0 | A/ | W/ | F/ | S/5 |
|---|---|---|---|---|
| R/1 | H/ | Q/ | D/ | P/6 |
| M/2 | U/ | E/ | O/ | V/7 |
| N/3 | B/ | I/ | Y/ | K/8 |
| T/4 | Z/ | G/ | J/ | C/9 |

TABLE 5

| L/0 | H/ | R/1 | D/ | M/2 |
|---|---|---|---|---|
| A/ | N/3 | Q/ | T/4 | U/ |
| S/5 | B/ | P/6 | Y/ | V/7 |
| W/ | K/8 | I/ | C/9 | E/ |
| F/ | Z/ | G/ | J/ | O/ |

The SecureWords "SHORT ROAR", "LOOSE NOOSE", "STREAKY", "ACNE ZIT" and "NO MORE CHOO—CHOO" represent particular numeric sequences. In this particular MasterCode, no vowels are used.

Referring to Table 2 in conjunction with Table 3 (or optionally Tables 4 or 5), the sequence used to simply decode the SecureWords can easily be seen. In the actual decoding, extraneous letters and symbols are removed. Then the remaining letters are related back to the original digit. Referring to Table 6 this two—step process is shown.

TABLE 6

| MasterCode<br>SecureWord | L R M N T S P V K C<br>Encrypted Sequence | Numeric Sequence |
|---|---|---|
| SHORT ROAR | SRTRR | 51411 |
| LOOSE NOOSE | LSNS | 0535 |
| STREAKY | STRK | 5418 |
| ACNE ZIT | CNT | 934 |
| NO MORE CHOO-CHOO | NMRCC | 32199 |

The SecureWord system user can also alias letters. In one example, if the letter Z is an alias for S then ACNE ZIT would become CNST and decode to 9354. The complexity of aliasing is limited only by the user. The aliasing would result in compression on decoding (Z and S both map to S) and an expansion in encryption (S mapping to both S and Z).

Referring to FIG. 1 there is shown a flow chart of the steps involved in the SecureWord system for generating a MasterCode and a MasterGrid. In step 10 a unique MasterCode is generated. The generation is done in two sub-steps. In sub-step 12 a set of ten characters are selected. NOTE: In English this is practical, but not necessary to the invention. The actual selection may be chosen to optimize the generation of multiple words, may be random, or have a particular meaning. In sub-step 14 the system randomly associates each selected character with a corresponding digit. The association of the selected characters should be tested to reject an obvious relationship such as the letter/number arrangement on a telephone dial or in any of the various memory aid systems described herein. In step 20 a unique MasterGrid is generated. The generation is done in three sub-steps. In sub-step 22 a grid size is selected. While the examples are for square grids, the grid may be an n by m rectangle or other shape providing it accommodates one instance of each character in the set from which the MasterCode is drawn. In sub-step 24 a method for embedding the MasterCode is selected. In sub-step 26 the remaining entries of the MasterGrid which do not contain the embedded MasterCode are filled.

Referring to FIG. 2 there is shown a flow chart of the steps involved in the SecureWord system for generating a SecureWord. In step 30 a SecureWord is generated using the MasterCode. In sub-step 32 a numeric sequence is translated into the corresponding characters of the MasterCode. In sub-step 34 the letter sequence is expanded into an ordinary English word. If too few, by user criteria, or no SecureWords are created, the group of characters will be broken into smaller groupings so as to produce at least one word from each sub group. If SecureWords or sets of SecureWords are not yet produced, the subsets are further broken into smaller groupings. If no SecureWord or an insufficient number to satisfy the user are available a new MasterCode is generated and the procedure repeated.

Referring to FIG. 3 there is shown a flow chart of the steps involved in the SecureWord system for decoding a SecureWord. In step 40 a particular SecureWord is decoded in three sub-steps. In sub-step 42 the MasterCode is located within the MasterGrid. In sub-step 44 extraneous letters and symbols are removed. In sub-step 46 the reduced letter sequence is then translated, using the MasterCode within the MasterGrid, into the original numeric sequence.

Figure 4:
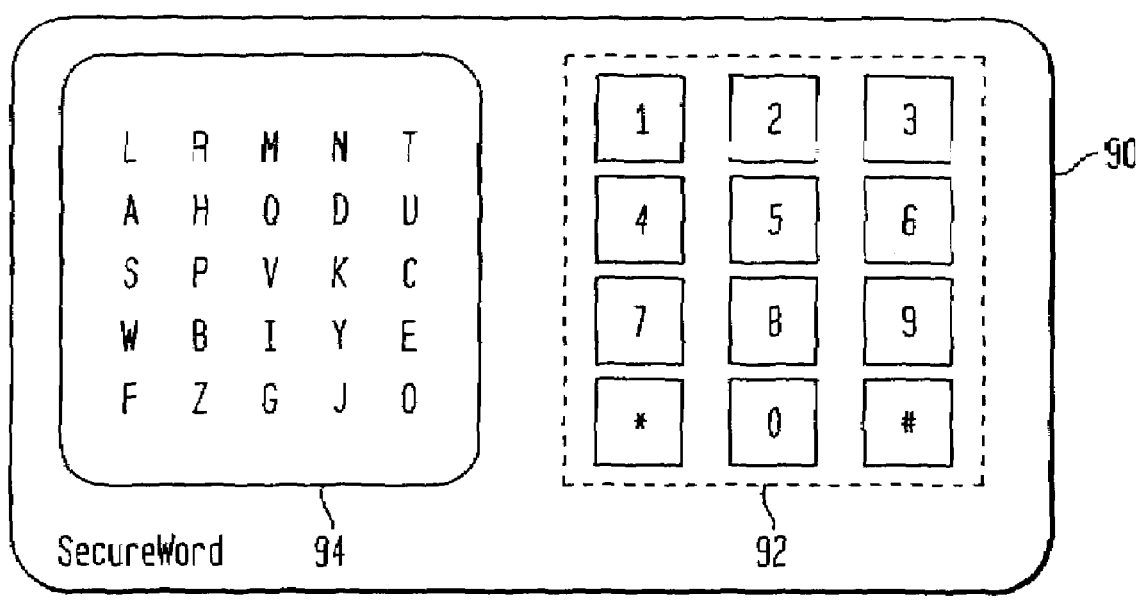
FIG. 4 is a diagram of a representative embodiment of a SecureWord computer.

Referring to FIG. 4 there is shown a block diagram of a SecureWord computer system. The SecureWord computer system can be implemented on a general-purpose computer, a specialized computer system or even on a chip level. A hand held SecureWord computer 90 can be used to generate the MasterCode and MasterGrid. While the particular embodiment is shown with only a numeric keypad 92, it can easily be expanded to a full alphanumeric keypad. The SecureWord computer 90 has an integral display 94 sufficiently large to show the MasterGrid. After a MasterCode and a MasterGrid is generated and permanently stored within internal memory, the SecureWord computer permits entry of a numeric sequence. The numeric sequence is then translated into letters and word list lookup is provided. This lookup then permits the expansion of the letter sequences into words in the word list fitting the aforementioned criteria. These extracted words are then shown on the display allowing the user to make external copies. To decode a SecureWord the user selects the display of the permanently stored MasterGrid on the integral display 94 of the SecureWord computer 90. The user then determines how the MasterCode is embedded into the MasterGrid that is being displayed. Thus permitting the decoding of the SecureWord into the original numeric sequence.

Figure 5:
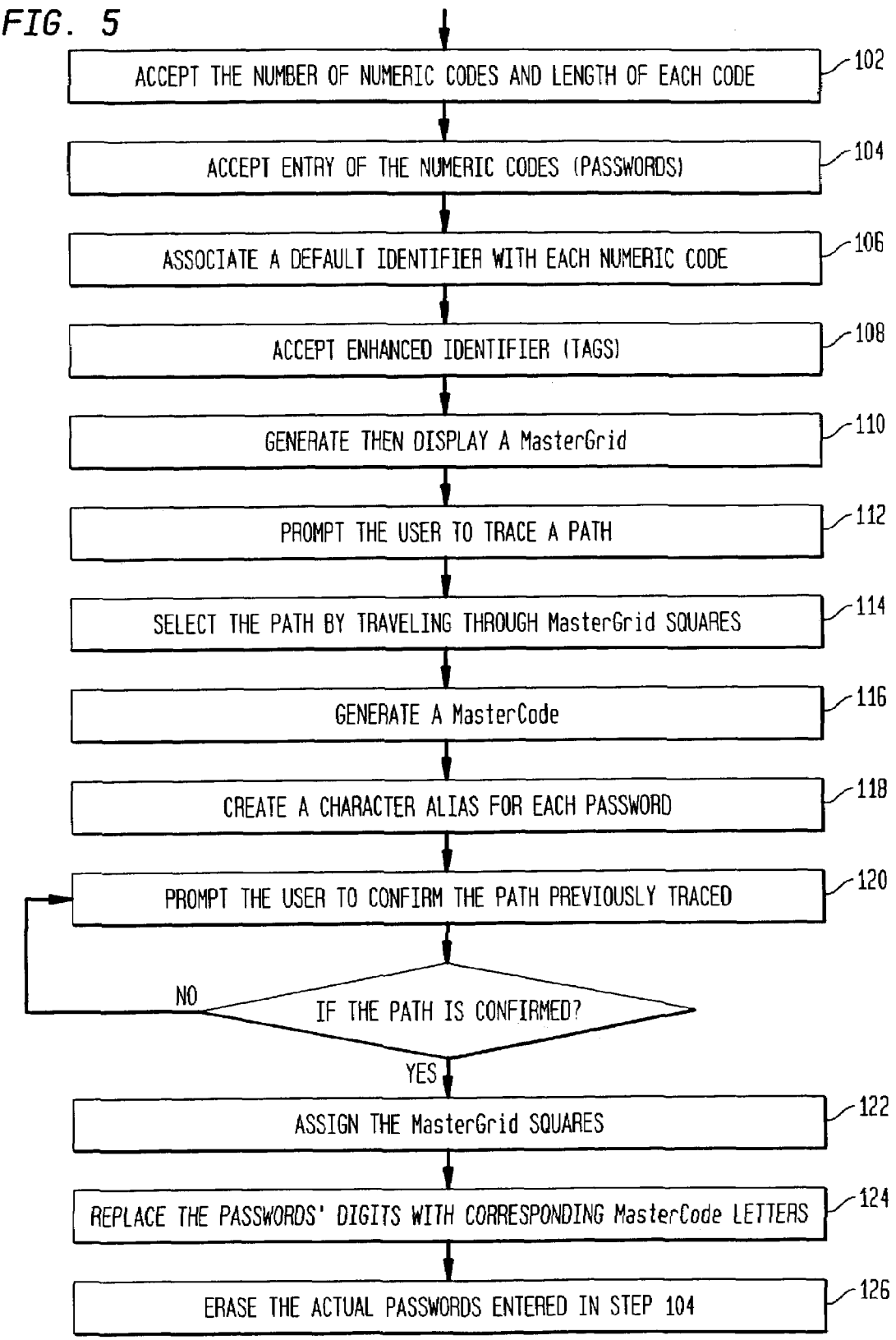
FIG. 5 is a flow chart of the steps for securing a list of numeric codes in a SecureWord computer.

Referring to FIG. 5, there is shown a flow chart of one embodiment of the present invention for securing a list of numeric codes. Initially, in step 102, the system accepts (such as from a user) the number of numeric codes (passwords) and the length of each code (number of digits contained in each code/password). Alternately, the number and length of the codes may be dynamically determined during entry of the passwords. In step 104, the system accepts entry of the numeric codes, such as numeric passwords, safe combinations, numeric sequences, etc. A default identifier (tag), such as Password1, Password2 . . . Passwordn, is associated with each numeric code in step 106. Optionally, in step 108, the system accepts enhanced identifiers or tags for each password (descriptions such as "safe", "padlock", "ss no", etc.). A 6×6 MasterGrid (which defines 36 grid squares) is generated and then displayed in step 110. This MasterGrid contains the 26 alphabet characters and 10 symbols, which are randomly positioned within the MasterGrid. In step 112, the system prompts the user to trace a path. The path is selected by traveling once through each of ten (10) MasterGrid squares, which is recorded in step 114. The selected path may be continuous, over lapping or discontinuous. If the selected path crosses (over laps) itself, then only the first time a square is crossed wills the square be counted. In the case where the path crosses itself, the system will consider the path to be discontinuous and skip a square the second occurrence of a particular square in the path. However, for user simplicity, the actual tracing may be continuous. A MasterCode, in step 116, is generated by the system internally. As previously explained, the MasterCode, in step 118, is used to create a character alias for each password. (In alternative embodiments, other systems of encryption may be used.) The system then prompts the user to confirm the path previously traced in step 120. If the path is not confirmed to match the selected path, then the system notifies the user of the error and repeats step 120. (Alternatively, the system may allow reentry of the original path and then request confirmation). When the path is confirmed to match the selected path, then the MasterGrid squares, which are contained in the traced path, are assigned the MasterList characters in step 122. The passwords' digits are then replaced with their corresponding MasterCode letters and stored in step 124. The actual passwords, which where entered in step 104 are now erased in step 126.

2. SecureNumber

In an alternate embodiment, it is recognized that passwords to date are becoming increasingly more complex.

Changes in the use of input devices, driven by the advent of computers on the Internet, have drawn away from devices that corresponded to a telephone key pad, with alphanumeric characters represented thereon, to a fully functional typewriter/computer keyboard including upper and lower case alpha characters, numerals and typographical symbols. This change has been reflected in advancing password security through the use of requirements for various combinations of alpha characters, numbers and symbols. The result is a non-uniform format for the use and entry of passwords. This has increased the users ability to create various combinations, which are difficult at best to memorize on first viewing. This requires users to write down these passwords and keep them in a safe place if this increased capability is to be at all useful.

One solution to this problem is to provide a way of masking the various combinations in a way that is easy for the user to remember how the passwords are to be viewed. An implementation of this solution is to draw a numerical relationship to the characters that are being used that is then incorporated into a MasterGrid to mask the passwords. The present embodiment uses numbers (Secure Numbers) to protect passwords drawn from a character set that can include upper and lower case letters, numbers and symbols. The present invention may be utilized equally well with a pencil and paper as well as being implemented by a computer program or stored in a microprocessor device. It can be built into a computer integrated circuit designed for this purpose or reside as software in a digital device.

Figure 11:
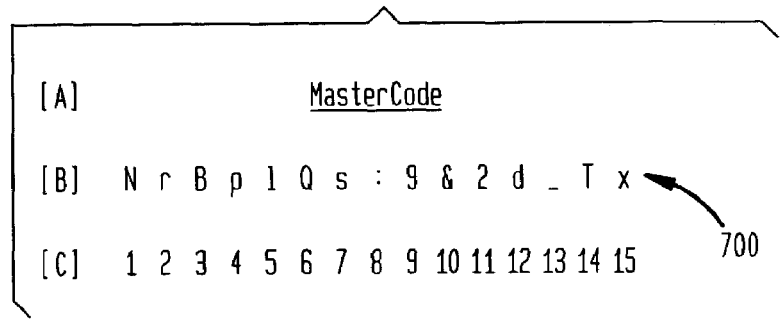
FIG. 11 is a representation of a MasterCode according to an alternate embodiment of the present invention which makes SecureNumbers to protect passwords drawn from a character set of letters, numbers and symbols.

With reference to FIG. 11 a representation of a password character set 700 is shown that represent all of the characters currently being used in an individual's family of passwords. This family is a subset of the 90 alphanumeric symbolic character found on standard alphanumeric keyboards, which include symbols. Since many computer programs reserve the use of some symbols, a set of 81 characters is used for illustrative purposes. The characters are identified numerically in sequential order. The exact order of the characters is not important. It is desired, however, that the sequence appear to be random and does not form any pattern or recognizable natural language words. For purposes of illustrating the inventive features of this embodiment, the password character set is described as having fifteen characters; however, the number of characters can be more or less as dictated by the user concerns In administrated setting, the unique character count of the passwords already assigned will vary among assignees with no adverse or compromising consequences to any of them using SecureNumbers to protect their own group of passwords.

Figure 12:
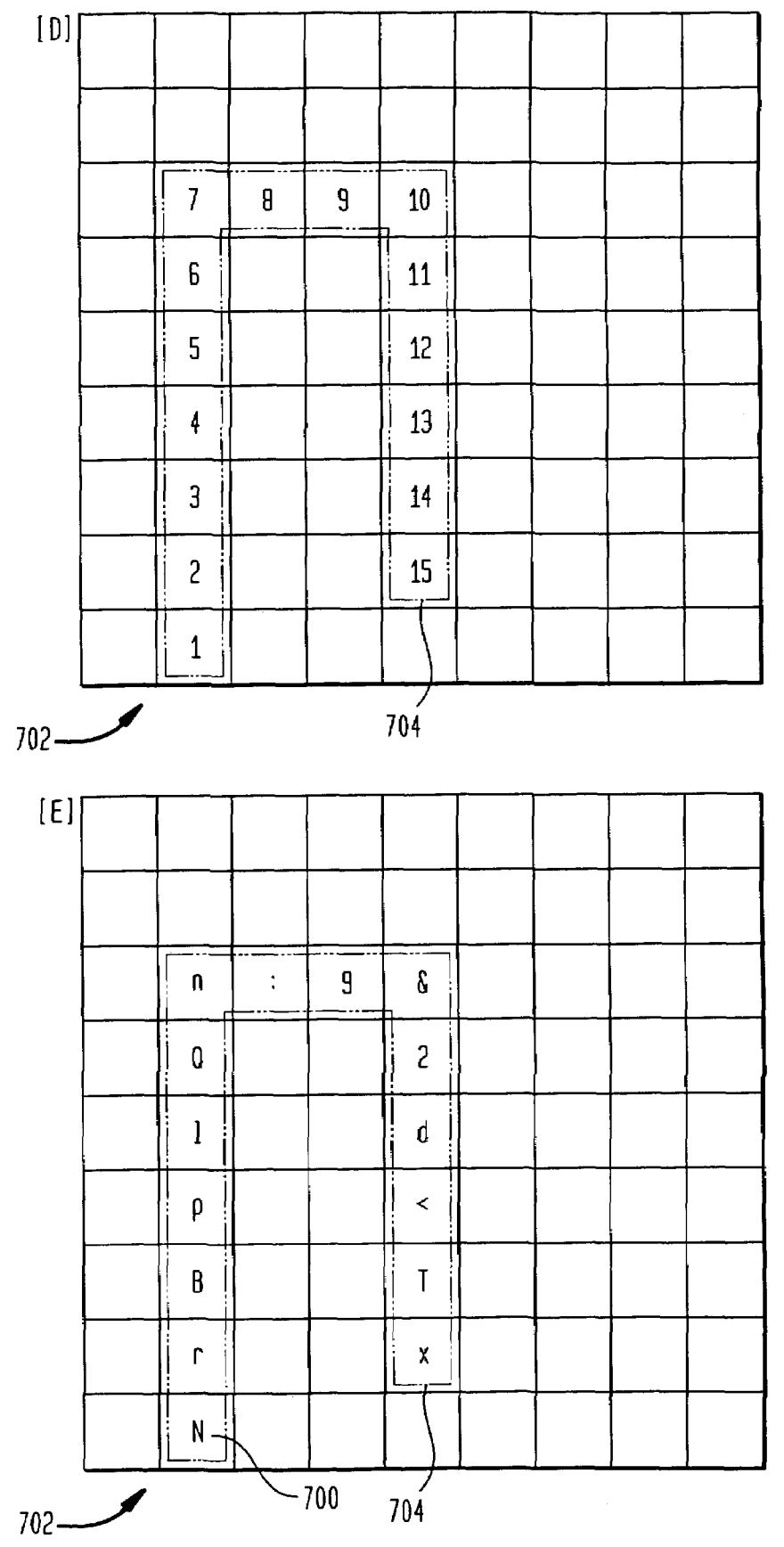

Once the characters have been identified a 9×9 grid is formed (FIG. 12), the user identifies a pattern 704 by selecting in order a set of cells from the grid corresponding to the number of characters in the password character set. The selection of the cells preferably forms a pattern, which is easy for the user to remember. The order of the cells can be continuous as shown in FIG. 12 or can be discontinuous points or any combination thereof. The pattern selection can be any image that is easy for the user to remember and corresponds to the number of characters in the password character set. With reference to FIG. 13, once the cells have been chosen in numerical order, the characters are then filled in according to their numerical relationship assigned earlier. By retracing the grid pattern in numerical order the user can then identify the characters of the password character set.

Once the characters of the MasterCode have been placed in the grid, the remainder of the grid (FIG. 14) is filled in randomly with the other characters 706 to form a MasterGrid. In this way the pattern formed by the password character set is masked.

The formation of the password character set is by taking each of the passwords assigned to the user and adding each character once from each of the passwords to the list. With reference to FIG. 15, five passwords 708–712 are shown each of, which has contributed one or more characters to the password character set. It will be appreciated by those skilled in the art that passwords may be pre-existing passwords that the user has acquired from a number of different computer accounts or the list of passwords may be assigned by a central authority such as a system administrator.

With reference to FIG. 16, once the character set has been developed and provided with a numerical order, such order forms a MasterCode that can then be used to translate each of the passwords to a numerical combination. As will be shown in the coming figures, the MasterCode may be identified only when the pattern has been retraced in the grid. With reference to FIGS. 17 and 18, by retracing the pattern according to a numerical sequence each of the characters comprising the password character set are located. Then using the MasterCode, the passwords are derived from the numerical representations of the passwords. It will be appreciated by those skilled in the art, the identification of the MasterCode is virtually impossible without knowledge of the pattern chosen by the user and the order in which the cells are selected that make up the pattern. FIG. 19 illustrates how the MasterCode and the MasterGrid may be left in plain view, but has no value to anyone without the pictorial relationship provided by the retracing of the pattern on the MasterGrid. It will further be appreciated that any or all SecureNumbers may be transposed or reordered, such as reverse order, for additional password protection in plain view.

Figure 6:
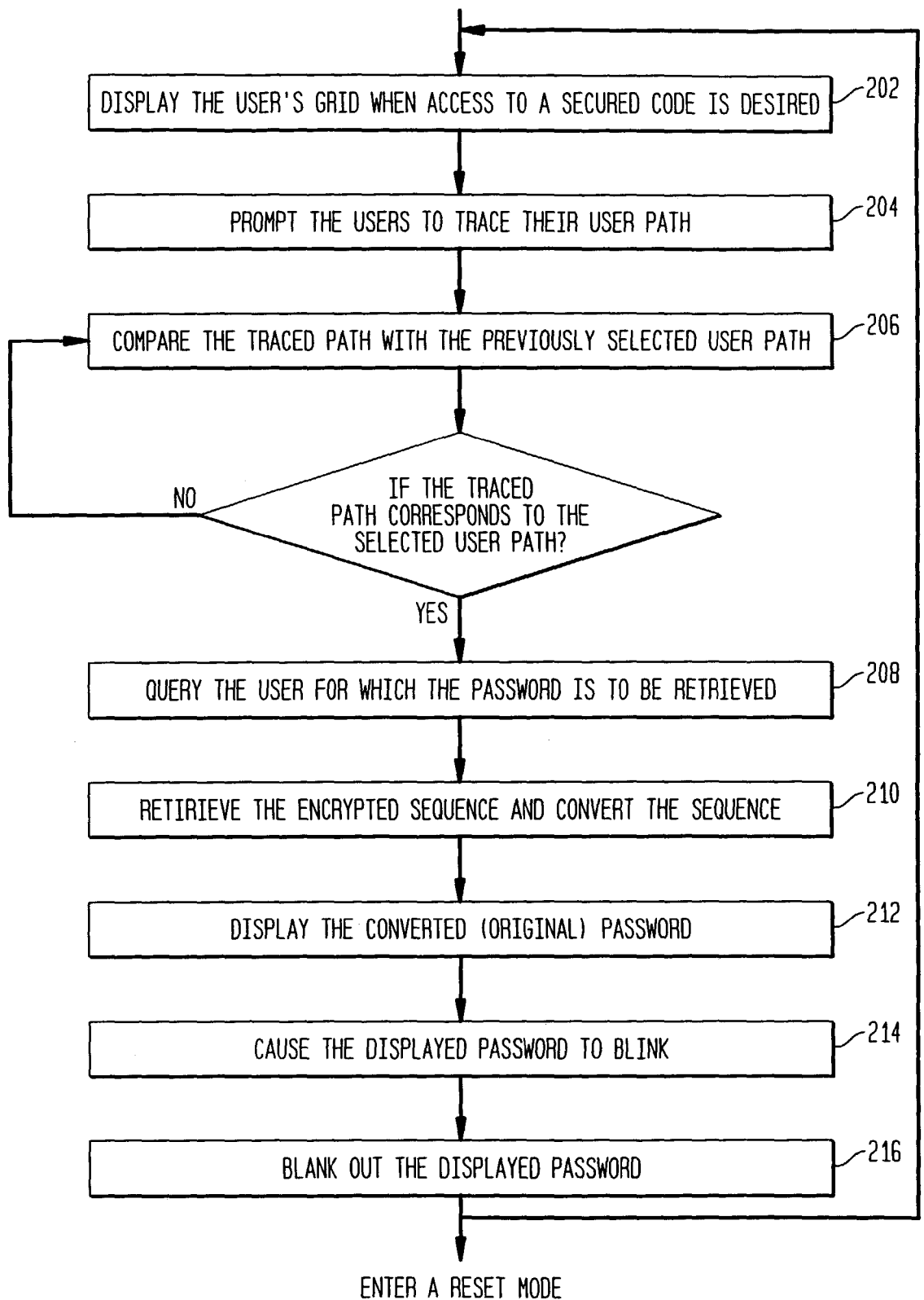
FIG. 6 is a flow chart of the steps for accessing a secured code in a SecureWord computer.

Referring to FIG. 6, there is shown a flow chart for accessing a Secure Number. When access to a secured code (secured numeric sequence) is desired, in step 202, the system displays the user's grid. The system, in step 204, then prompts the user to trace their particular user path through the displayed user grid. A comparison is made in step 206 by the system between the traced path and the previously selected user path. If the traced path corresponds to the previously selected user path, then in step 208 the system queries the user for which password is to be retrieved, otherwise when the paths do not correspond, the system returns to step 206 for up to a predetermined number of times for entry of the correct path. In step 210, the system retrieves the encrypted sequence, from the systems memory or storage, which corresponds to the selected password, based on the response to the query in step 208. The encrypted sequence is converted using the MasterList into the original password in step 210. The converted password is then displayed in step 212. After a time interval the system will cause the displayed password to blink, in step 214. After a further time interval, in step 216 the system will blank out the displayed password. At this point, the system can return to waiting for another user access prior to display of the user's grid, or alternatively power down or enter a reset mode.

Figure 7:
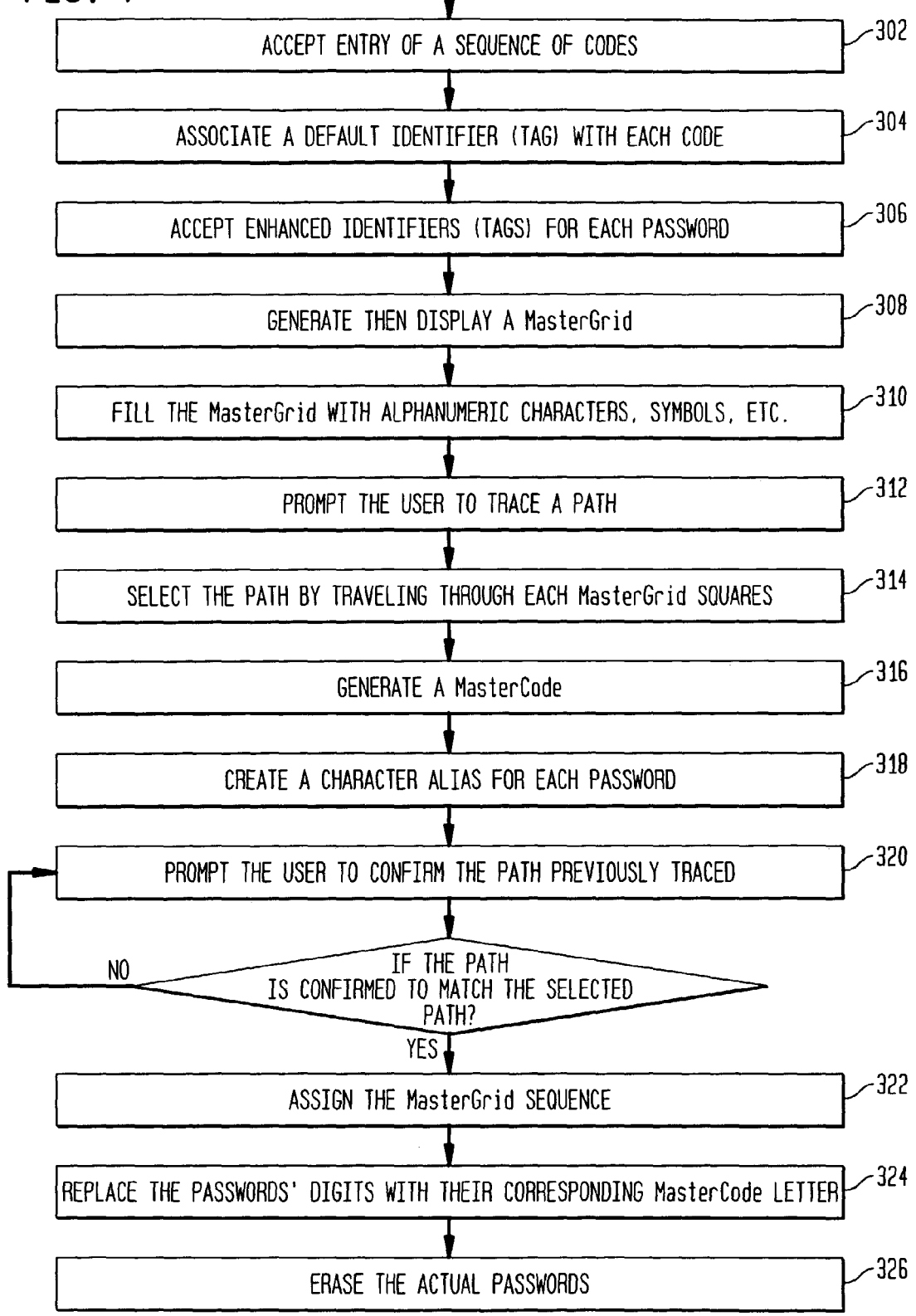
FIG. 7 is a flow chart of the steps for securing preexisting passwords which are alphanumeric as well as include other keyboard symbols.

Referring to FIG. 7, there is shown a flow chart of another exemplary embodiment of the present invention, which enables the securing of preexisting passwords, which are alphanumeric as well as include other keyboard symbols. Consider a particular example with 4 passwords, each 6 characters long, containing a total of 15 different characters (some of the characters occur in more than one password and may occur more than once in a particular password). In step 302, the system accepts entry of a sequence of codes, such as passwords, safe combinations, etc. A default identifier (tag), such as Password1, Password2 . . . Passwordn, is associated with each code in step 304. Optionally, in step 306, the system accepts enhanced identifiers or tags for each password (descriptions such as "safe", "padlock", "ss no", etc.). A MasterGrid such as a 6×6, 6×7, 6×8, 7×6, 7×7, 7×8, etc. is generated and then displayed in step 308. This MasterGrid is then filled with alphanumeric characters, symbols, pictograms, etc., which are randomly positioned within the MasterGrid in step 310. (The symbols and characters, which are used to fill the grid, may include characters contained within the passwords themselves.) In step 312, the system prompts the user to trace a path. The path is selected by traveling once through each of fifteen (15) MasterGrid squares, which is recorded in step 314. The length of the path must be at least as long as the number of unique characters contained in the passwords (which is 15 in this example). The selected path may be continuous, over lapping or discontinuous. If the selected path crosses (over laps) itself, then only the first time a square is crossed will the square be counted. In the case where the path crosses itself, the system will consider the path to be discontinuous and skip a square the second occurrence of a particular square in the path. However, for user simplicity, the actual tracing may be continuous. A MasterCode, in step 316, is generated by the system internally. As previously explained, the MasterCode, in step 318, is used to create a character alias for each password. (In alternative embodiments, other systems of encryption may be used.) The system then prompts the user to confirm the path previously traced in step 320. If the path is not confirmed to match the selected path, then the system notifies the user of the error and repeats step 320. (Alternatively, the system may allow reentry of the original path and then request confirmation.) When the path is confirmed to match the selected path, then the MasterGrid squares, which are contained in the traced path, are assigned the MasterList characters in step 322. The passwords' digits are then replaced with their corresponding MasterCode letters and stored in step 324. The actual passwords, which where entered in step 302 are now erased in step 326.

When the user desires to access a Secured Password, the user's MasterGrid is displayed and the user is prompted to trace the user path through the user grid. Details of the access are the same as previously described for steps 202 through 216.

Figure 8:
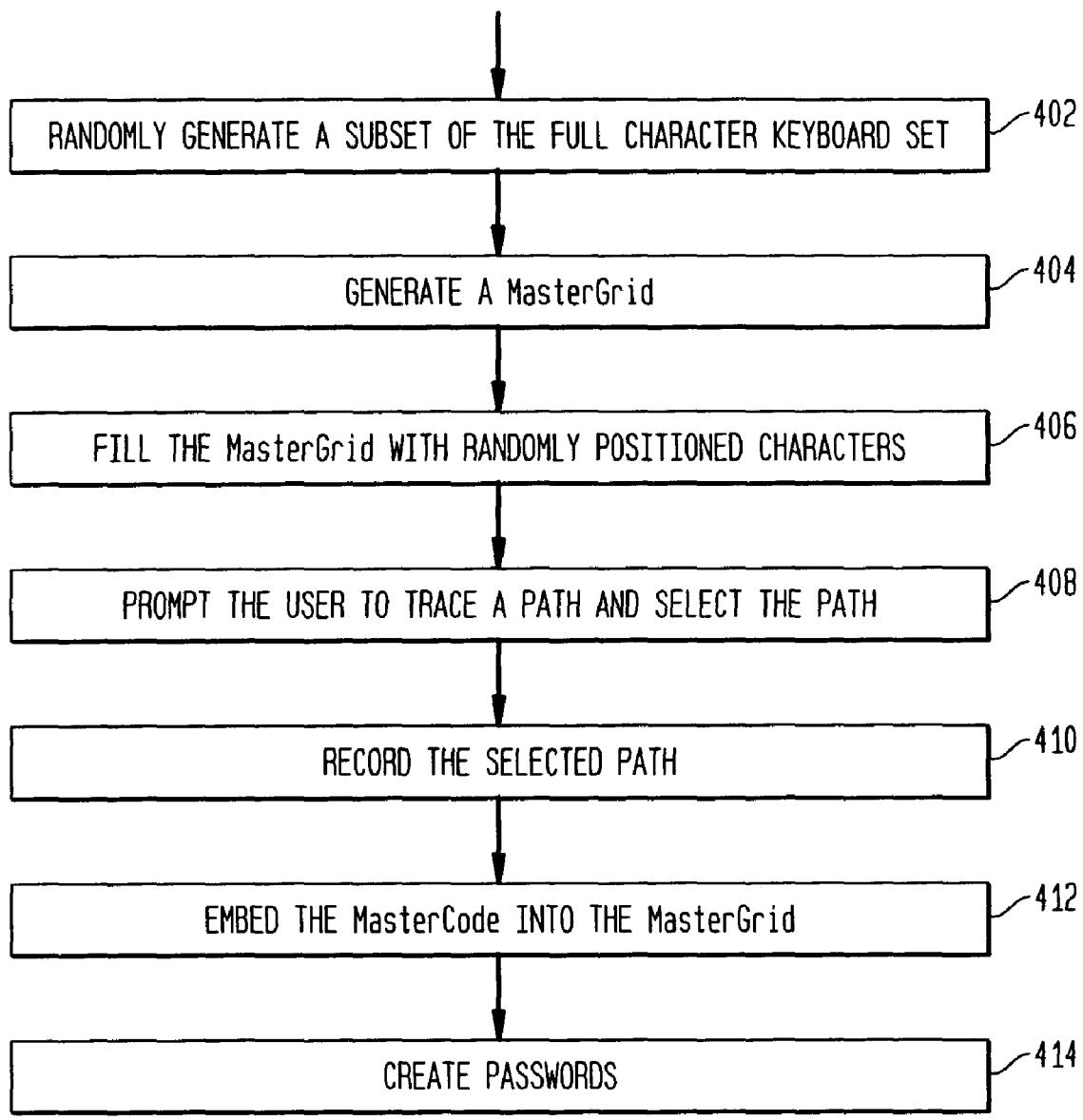
FIG. 8 is a flow chart of the steps for generating passwords using a full 90-character keyboard set.

Referring to FIG. 8, there is shown a flow chart of yet another exemplary embodiment of the present invention, which enables generating passwords using a full 90 character keyboard set (52 upper case and lower case letters, 10 numeric digits, and 28 special characters). In step 402, a randomly generated subset of the full set is made available for a particular user. The size of the subset can be determined by the user or by an administrator. A MasterGrid containing approximately two to four times as many squares as there are elements in the subset is generated in step 404. When the full—or almost full—keyboard set is used as the subset, the MasterGrid would be 9×9 or 9×10. The MasterGrid is filled with randomly positioned characters from the full set in step 406. In step 408, the system prompts the user to trace a path. The path is selected by choosing a number of MasterGrid squares corresponding to the number of elements in the subset. The selected path is recorded in step 410. The selected path may be continuous, over lapping or discontinuous. If the selected path crosses (over laps) itself, then only the first time a square is crossed will the square be counted. In the case where the path crosses itself, the system will consider the path to be discontinuous and skip a square the second occurrence of a particular square in the path. However, for user simplicity, the actual tracing may be continuous. The MasterCode, which is the subset, is then embedded into the MasterGrid in the selected path in step 412. The SecureWord method previously described is used in step 414 to create passwords.

Pattern Recognition Embodiment

Figure 9:
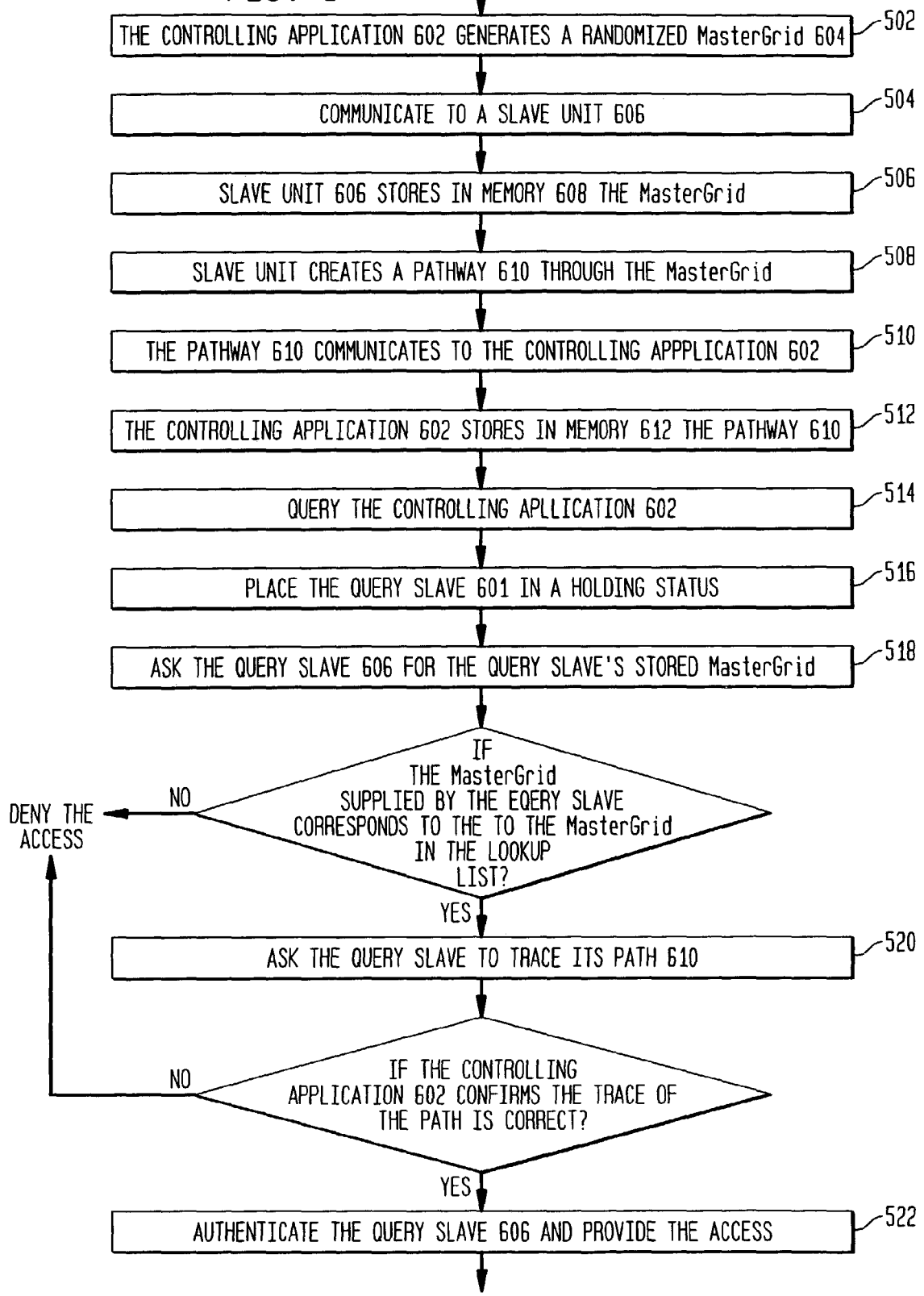
FIG. 9 is a flow chart of the steps for authentication of a remote application or system.
Figure 10:
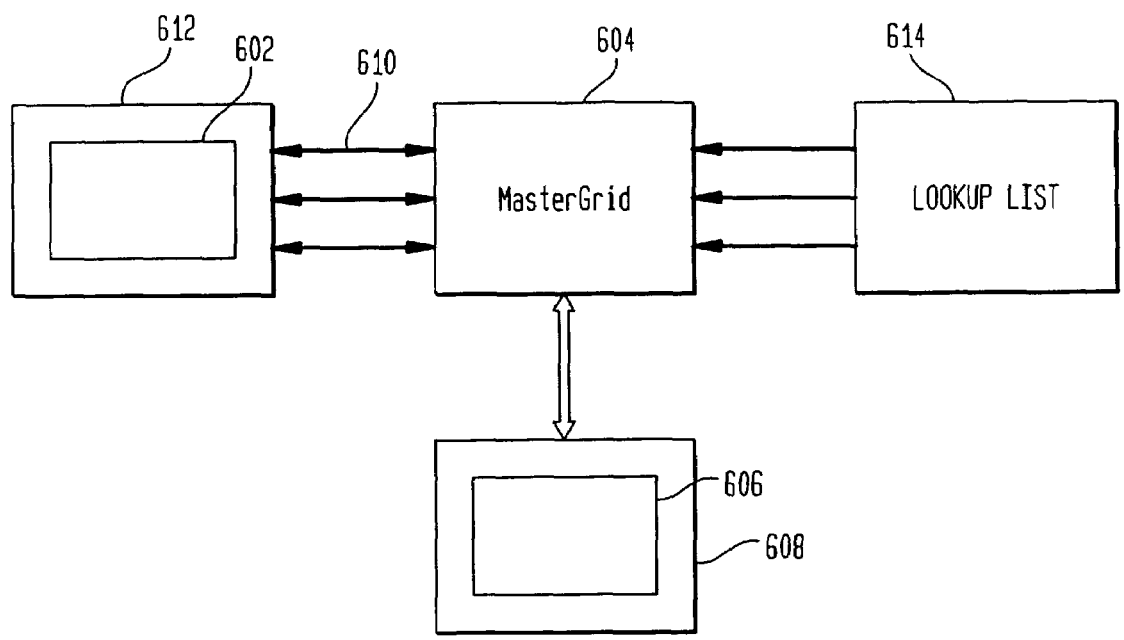
FIG. 10 is a high-level block diagram of a controlling and remote application, which utilizes the system for authentication.

Referring to FIGS. 9 and 10, there is shown a flow chart and functional diagram of a further exemplary embodiment of the present invention, in which a pathway through a MasterGrid is used as a means of authentication of a remote application or system. In step 502, the controlling application 602 generates a randomized MasterGrid 604. The MasterGrid, in step 504 is communicated to a slave unit 606. The slave unit 606 stores in memory 608 the MasterGrid in step 506. The slave unit, in step 508, creates a pathway 610 through the MasterGrid. The pathway 610 is then communicated to the controlling application 602 in step 510. The controlling application 602 stores in memory 612 the pathway 610 in step 512. When a query is made to the control application 602 in step 514, where the query claims to be a valid slave, the slave's name is checked. In step 516, when the name is found on a lookup list 614, the query slave 606 is placed in a holding status, otherwise access is denied. After the query slave 606 is placed in a holding status, the query slave 606 is then asked for the query slave's stored MasterGrid in step 518. If the MasterGrid supplied by the query slave from memory 608 corresponds to the MasterGrid currently assigned to the slave as found in the lookup list 614, the query slave 606 is asked to trace its path 610 in step 520, otherwise access is denied. In step 522, if the controlling application 602 confirms that the query slave 606 trace of the path 610 is correct (corresponds to the path stored in the lookup list 614), the query slave 606 is authenticated and access is provided, otherwise access is denied. The path 610 may be encoded as a grid reference, a character string corresponding to the traced path, or by other positional/sequential references.

It will further be appreciated that the present embodiment of the invention may be implemented on a computer or processor enabled handheld device, including, but not limited to a cellular phone, personal data assistant (PDA) or a beeper. Those skilled in the art will appreciate that the computer implementation is well suited for devices that have a graphical user interface such a mouse that controls a pointer on a screen. The mouse can be used with the pointer to unmask a password either using it internally or displaying it for use elsewhere.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

What is claimed:

1. A method of using a grid containing a symbol or pictogram to gain access to encrypted passwords, in which the grid is broken into cells;

the method comprising:
placing in each cell at least a portion of the symbol or pictogram used to identify a user of subordinate device;
identifying a user of a subordinate device; and
granting access to the encrypted passwords upon identification of the user.

2. The method of claim 1 wherein the grid is linked to the user's name or other identifying input either mechanical or biocentric.

3. The method of claim 2 wherein a superior device presents an array of grids of the same size as said cell with the same content but arranged differently
and providing a selection arrangement by which a user selects one to be linked as an identifier.

4. The method of claim 2 wherein a superior device presents an array of grids of the same size as said cell with the grids content being differently and providing a selection arrangement by which a user selects one to be linked as an identifier.

5. The method of claim 1 wherein a user or subordinate device creates an exclusive pattern within said grid in any cell in the grid.

6. The method of claim 3 wherein the sequence in which the cells are selected become part of the identification.

7. The method of claim 1 wherein access is obtained by first displaying an identifying grid, and gaining access only after correctly recreating a particular symbol or pictogram in the grid.

8. The method of claim 1 wherein access to a stored password is obtained by correctly selecting the proper identifying grid from an array of grids, and by correctly indicating the image, symbol or pictogram within the grid.

9. The method of claim 1 wherein a user chooses a particular pattern by spoken words which is stored to provide subsequent access thereto.

10. The method of claim 9 further including storage of voiceprints to insure that a proper user is reciting the words when retrieving said pattern.

11. A method of using a grid to gain access to encrypted passwords, in which the grid is broken into cells; and wherein, each cell contains a non-complex image, symbol or pictogram;

the method comprising assigning to a plurality of cells each a portion of the encrypted password;
assembling the portions of the encrypted password in sequence as the user selects each cell; and
granting access to a user when the user selects the cells in the proper order to assemble the encrypted password.

12. A method of using a grid containing an image to gain access to encrypted passwords, in which the grid is broken into cells;

the method comprising:
placing in each cell a non-complex portion of the image used to identify a user of subordinate device;
identifying a user of a subordinate device; and
granting access to the encrypted passwords upon identification of the user.

13. The method of claim 12 wherein the grid is linked to the user's name or other identifying input either mechanical or biocentric.

14. The methods of claim 12 wherein a superior device presents an array of girds of the same size as said cell with the same content but arranged differently
and providing a selection arrangement by which a user selects one to be linked as an identifier.

15. The method of claim 12 wherein a user or subordinate device creates and exclusive pattern within said grid in any cell in the grid.

16. The method of claim 14 wherein the sequence in which the cells are selected become part of the identification.

* * * * *